United States Patent [19]

Emmons

[11] 3,864,335
[45] Feb. 4, 1975

[54] POLYFUNCTIONAL ESTER OXAZOLIDINES

[75] Inventor: William D. Emmons, Huntingdon Valley, Pa.

[73] Assignee: Rohm and Haas Company, Philadelphia, Pa.

[22] Filed: Feb. 11, 1972

[21] Appl. No.: 225,673

Related U.S. Application Data

[63] Continuation-in-part of Ser. No. 768,905, Oct. 18, 1968, abandoned.

[52] U.S. Cl......... 260/240 R, 260/246 R, 260/307 F
[51] Int. Cl............................................. C07d 85/26
[58] Field of Search......... 260/307 F, 246 R, 240 R, 260/240 C

[56] References Cited
UNITED STATES PATENTS
3,661,923   5/1972   Emmons et al..................... 260/307

Primary Examiner—Raymond V. Rush
Attorney, Agent, or Firm—William E. Lambert, III; Betty A. Narducci

[57] ABSTRACT

Polyfunctional ester oxazolidines of the general formula

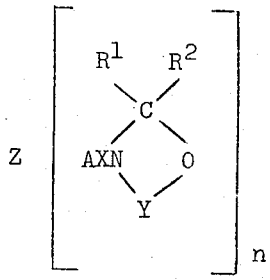

wherein Z is a polyvalent alkylene, arylene, or alkenylene radical, $R^1$ and $R^2$ are hydrogen, alkyl, phenyl, or benzyl,
X and Y are divalent ($C_2$-$C_3$) alkylene radicals, and
$n$ is an integer equal to the valence of Z, produced by means of a transesterification process are useful in preparing or formulating adhesives, caulks, lacquers, paints, varnishes, leather impregnants and moisture-cured coating systems.

14 Claims, No Drawings

POLYFUNCTIONAL ESTER OXAZOLIDINES

CROSS-REFERENCE TO RELATED APPLICATION

This application is a continuation-in-part of our copending application Ser. No. 768,905, filed on Oct. 18, 1968, now abandoned.

This invention relates to new compounds which may be generally referred to as polyfunctional ester oxazolidines. It also relates to their polymers, the preparation of the monomers and their polymers, and novel monomers and polymers derived therefrom.

For the most part, monofunctional oxazolidines and derivatives thereof have been used as stabilizers for rapid-curing resin solutions, and in adhesive systems. The prior art bis-oxazolidine is generally characterized by a fused-ring structure having a single nitrogen atom common to both rings. Some fused-ring bix-oxazolidines have been used in coating systems. The general method for producing these bis-oxazolidines was to react two moles of formaldehyde with one mole of a polyhydric aminohydroxy compound such as tris-(hydroxymethyl)aminomethane. This reaction is represented in the prior art as follows:

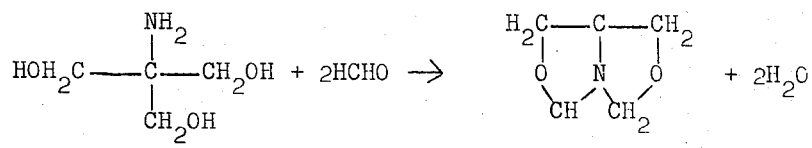

The preparation of monofunctional N-hydroxyalkyl-oxazolidines is known in the art. In general, they are prepared by reaction of the di(hydroxy-alkyl)amines such as diethanolamine or dipropanolamine with ketones or aldehydes in bulk or within an inert solvent such as xylene, benzene, or toluene, adapted to form an azeotrope with the water to aid in its removal. The mixture is heated to a temperature of 100°C. or higher depending on the pressure in order to distill water.

The novel compounds of this invention are those having the formula

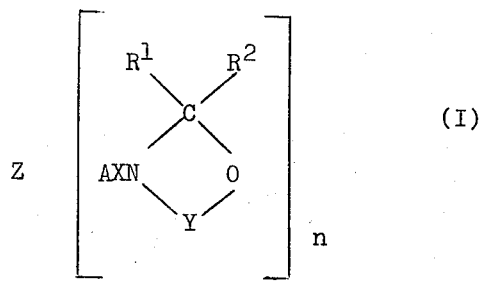

(I)

where $n$ is an integer equal to the valence of Z of at least two, preferably two or three, most preferably two; Z is a saturated alkylene hydrocarbon divalent radical, preferably having 1 to 34 carbon atoms, most preferably 1 to 4 carbon atoms, an $n$-valent phenylene, halo-substituted phenylene, or $(C_1$-$C_8)$alkyl-substituted phenylene group, the divalent hydrocarbon residue of 1,1,3-trimethyl-5-carboxy-3-(p-carboxy phenyl)indane, a $C_2$-$C_3$ unsaturated alkenyl divalent radical, or a

group;

A is selected from

(the left valence being connected to the Z radical) and —O— when Z is

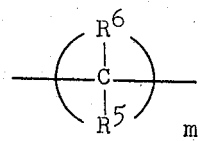

X is the radical

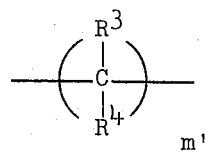

where $m$ is an integer of 2 or 3, preferably 2, and $R^5$ and $R^6$ are individually hydrogen or $(C_1$-$C_6)$alkyl groups, preferably hydrogen;

$R^1$ is hydrogen, phenyl, benzyl, or a $(C_1$-$C_{12})$alkyl group $R^2$ is hydrogen or a $(C_1$-$C_4)$alkyl group; or $R^1$ and $R^2$ can be taken together to form a single group selected from the group consisting of a pentamethylene group, a tetramethylene group, or a $(C_1$-$C_2)$alkyl-substituted pentamethylene or tetramethylene group; and Y is the radical

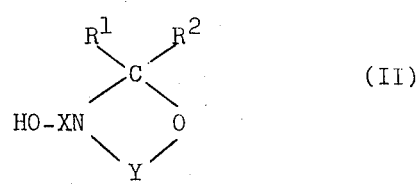

where $m'$ is an integer of 2 or 3, preferably 2, and $R^3$ and $R^4$ are individually hydrogen, phenyl, or benzyl groups. Preferably, $m$ and $m'$ will be equal.

Compounds of Formula I are produced by reacting a hydroxyl-terminated oxazolidine with an ester of a polybasic aliphatic or aromatic acid to effect the transesterification of the polyester. The monofunctional oxazolidine used as the transesterifying agent may be produced by reacting a secondary amine such as a secondary alkanolamine with an appropriate carbonyl compound such as an aldehyde or ketone to produce N-hydroxyalkyl-oxazolidine which is a cyclic amino alcohol of the general formula (II)

where X, R¹, R² and Y are as defined above.

The hydroxyalkyl compounds of Formula II used to react with the esters may be obtained by the reaction of diethanolamine or dipropanolamine, or the appropriate substituted diethanolamine or dipropanolamine, with an aldehyde or ketone, particularly those listed below:

| | |
|---|---|
| Formaldehyde | Acetone |
| Acetaldehyde | Methyl ethyl ketone |
| Propionaldehyde | Methyl propyl ketone |
| Butyraldehyde | Methyl isobutyl ketone |
| Benzaldehyde | Methyl isopropyl ketone |
| Cyclopentanone | Diisobutyl ketone |
| Cyclohexanone | Benzophenone |
| Dodecanal | | amount of from about 0.2 percent to about 5 percent and preferably from about 1 to about 3 percent based on the weight of the starting oxazolidine. Sodium methoxide or ethoxide as well as the potassium and lithium analogs may be used. An illustrative transesterification reaction would involve mixing of a starting oxazolidine and a polyester with a solution of the alkoxide in an alcohol, such as methanol. The alkoxide solution may be added gradually to the polyester-oxazolidine mixture. No additional solvent is needed. The temperature may be from 50° to about 180°C. and preferably not over 150°C.

The following reaction sequence is a general illustration of the formation of the novel polyfunctional ester oxazolidines of this invention:

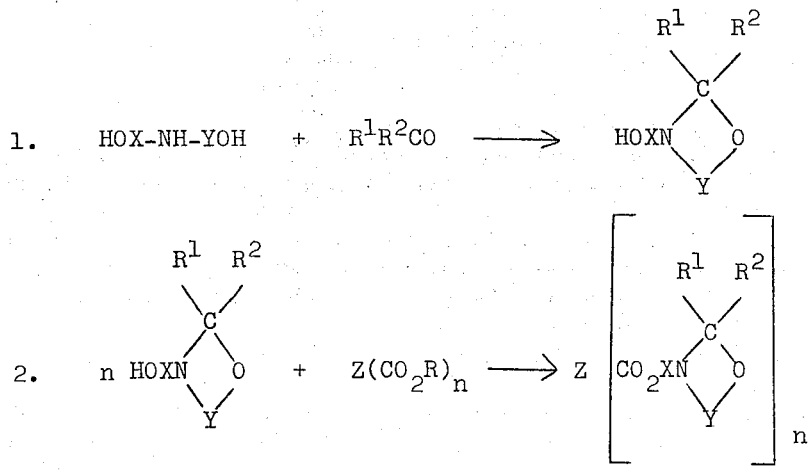

The preparation of the N-hydroxyalkyl-oxazolidines and tetrahydro-1,3-oxazines is well known in the art and their preparation is not part of the present invention. In general, they are prepared by reaction of the di(hydroxyalkyl)amines with the ketones or aldehydes in bulk or within an inert solvent such as xylene, benzene, or toluene, adapted to form an azeotrope with the water to aid in its removal. The mixture is heated to a temperature of 100°C. or higher depending on the pressure in order to distill water.

The transesterification reaction may, if desired, be base catalyzed. Suitable basic catalysts include sodium salts of phenols such as sodium phenoxide, p-hydroxydiphenylamine or a tetraalkyl titanate such as the tetraisopropyl or tetrabutyl titanate. If the reaction is carried out under alkaline conditions using a tetraalkyl titanate as the catalyst then about one-half percent to about ten percent, preferably 1 to 5 percent by weight of the titanate based on the weight of the oxazolidine is used. No solvent is needed. The starting materials may be used in stoichiometrically equivalent amounts; however, the ester may be used in an excess amount. The alcohol liberated during the transesterification is removed by azeotropic distillation of a mixture of the alcohol and the starting monomeric polyester. If desired, a polymerization inhibitor may be employed such as p-hydroxydiphenyl amine or diphenylenediamine. The reaction is generally carried out at temperatures of about 50° to about 180°C. and the completion of the reaction can be determined by measuring the amount of alcohol removed. The theoretical amount of alcohol that should be liberated out of the system by distillation is readily calculated.

Alkaline metal hydroxides may also be used as the transesterification catalyst. They may be used in the The polyfunctional oxazolidines of this invention are weak bases having no active hydrogen and in effect they are blocked non-reactive amines. However, the compounds of this invention become highly reactive when they are hydrolyzed by exposure to atomspheric moisture to produce a strong base having both amine and hydroxyl functionality. In addition, those polyfunctional oxazolidines having ethylenically unsaturated bonds may be polymerized either alone or with other copolymerizable materials forming coatings, impregnants, adhesives for textiles, leather, wood and metals, as well as binding agents for pigments, fibers and nonwoven fabrics.

In addition to the polyfunctional ester oxazolidines described above, certain carbonate diesters are within the scope of Formula I. The carbonate diesters may be produced by a two step transesterification process which involves (a) the preparation of the monoester by reacting a N-(2-hydroxyalkyl)oxazolidine with an excess of dimethyl carbonate and (b) reacting the monoester with excess oxazolidine in a suitable solvent, such as toluene, to produce the carbonate diester. The preparation of the carbonates is described in Procedure 4) below.

The polyfunctional ester oxazolidines of Formula I are characterized by at least two points of reactivity. A first reactive site is the double bond in the "Z" portion (when Z contains ethylenic unsaturation) of the molecule of Formula I by virtue of which the compounds are adapted to polymerize by the typical vinyl addition process to form linear polymers and copolymers. The second point of reactivity is in the cyclic radical itself which is preferentially hydrolyzable. As can be seen from the description given above, there are always at least two cyclic radicals in the compounds of the present invention, both of which are preferentially hydrolyzable.

The polyfunctional ester oxazalidine monomers and polymers of this invention may be mixed with electrophilic reagents, such as organic isocyanates, containing at least 2 isocyanate groups, to form a composition with good pot life which cures in the presence of moisture at ambient or elevated temperatures to produce tough, tack-free coating with excellent mechanical properties.

Representative of some of the polyfunctional ester oxazolidines of Formula I are bis[2-(3-oxazolidinyl)ethyl] adipate, bis[2-(3-oxazolidinyl)ethyl] o-phthalate, bis[2-(3-oxazolidinyl)ethyl] terephthalate, bis[2-(3-oxazolidinyl)-ethyl] isophthalate, bis[2-(2-isoproyl-3-oxazolidinyl)ethyl] adipate, bis[2-(2-isopropyl-3-oxazolidinyl)ethyl] o-phthalate, bis[2-(2-isopropyl-3-oxazolidinyl)ethyl] terephthalate, bis[2-(2-isopropyl-3-oxazolidinyl)ethyl] isophthalate, and the bis[2-(3-oxazolidinyl)ethyl] and bis[2-(2-isopropyl-3-oxazolidinyl)ethyl] esters, respectively, of 1, 3, 3--trimethyl-5-carboxy-3-(p-carboxyphenyl)indane.

The solubility characteristics of the compounds of Formula I can be predetermined by careful selection of the appropriate carbonyl compound used in the formation of the starting oxazolidine. Representative of the carbonyl compounds that may be used in this invention are formaldehyde, acetone, acetaldehyde, methyl ethyl ketone, propionaldehyde, methyl propyl ketone, butyraldehyde, methyl isobutyl ketone, benzaldehyde, methyl isopropyl ketone, cyclopentanone, diisobutyl ketone and cyclohexanone. It has been found that polyfunctional oxazolidines derived from starting oxazolidines based on formaldehyde and isobutyraldehyde are excellent starting materials for the electrophilic quenching reaction used to produce the moisture-cured coating systems described above. The moisture cured oxazolidine coating systems are the subject of a pending companion continuation-in-part application, Ser. No. 7,270, filed on Jan. 30, 1970 by William D. Emmons, now U.S. Pat. No. 3,743,626 entitled Hydrocurable Oxazolidine-Isocyanate Compositions, and assigned to a common assignee.

The polyester starting material in the transesterification reaction may be derived from an appropriate polycarboxylic acid such as saturated dicarboxylic acids, e.g. oxalic, malonic, succinic, methylmalonic, isosuccinic, glutaric, adipic, pinielic, sebacic acid, azelaic acid, 1,6-ethylhexanedioic acid, dodecanedioic acid, 1,18-octadecanedioic acid, 1,36-hexatriacontanedioic acid, and the like, unsaturated dicarboxylic acids, e.g. itaconic, maleic, fumaric, α-methyleneglutaric, aromatic dicarboxylic acids, e.g. o-phthalic, terephthalic, isophthalic, tetrachlorophthalic, mellitic, pyromellitic and 1,1,3-trimethyl-5-carboxy-3-(p-carboxyphenyl)indane.

The monomeric compounds having ethylenic unsaturation of Formula I may be suspended in an aqueous medium preferably in particulate form and upon acidification of the medium such as by means of acetic acid, phosphoric acid, sulfuric acid, and the like, the monomer is hydrolyzed to a secondary amine or complex thereof with ketone or aldehyde which forms a salt of the acid present and which carries an hydroxyalkyl group on the nitrogen atom. This salt is polymerizable in aqueous systems. Thus, it may be dissolved in water and polymerized by water-soluble initiators or catalysts such as ammonium persulfate optionally with a reducing agent such as potassium metabisulfite in a redox system.

The unsaturated compounds of Formula I can be copolymerized with various other ethylenically unsaturated monomers, and especially the monoethylenically unsaturated monomers adapted to produce linear copolymers. Thus, copolymers may be made containing from about ½ to 99.5 percent by weight of a compound of Formula I with at least one of the following monomers: vinyl acetate, acrylonitrile, acrylamide, methacrylamide, styrene, halogen or alkyl-substituted styrene, vinyltoluene, vinylidene chloride, vinyl chloride, vinyl laurate, esters of acrylic acid or methacrylic acid having from 1 to 18 carbon atoms in the alcohol moiety such as methyl methacrylate, methyl acrylate, ethyl acrylate, butyl acrylate or methacrylate, cyclohexyl acrylate or methacrylate, 2-ethylhexyl acrylate or methacrylate, dodecyl acrylate or methacrylate, and octadecyl acrylate or methacrylate.

The polymers and copolymers of the compounds of Formula I may be prepared by either a bulk, a solvent, or an aqueous emulsion technique using organic solvents such as acetone, dioxane, dimethylformamide, and acetonitrile, and azo catalysts such as diazodiisobutyronitrile and dimethyl-a,a'-azodiisobutyrate. The proportion of azo catalyst or initiator may be between 0.1 percent and 5 percent and is preferably between about 0.5 percent and 1.5 percent, on the weight of the total polymerizable materials.

To assist those skilled in the art to practice this invention, the following modes of operation are suggested by way of illustration, parts and percentages being by weight unless otherwise specifically noted.

1. Preparation of 3-(2-hydroxyethyl)-2-isopropyloxazolidine

To a stirred mixture of 315.3 g. (3.0 moles) of diethanolamine and 300 ml. of toluene was added 226 g. (3.10 moles) of isobutyraldehyde. The solution was heated to reflux, and water collected. At the end of 2.0 hr. the theoretical amount of water (54 ml.) was obtained. The toluene and excess isobutyraldehyde were removed by stripping the reaction solution under reduced pressure and the concentrate was subsequently distilled. There was obtained 433.5 g. (91 percent) of a colorless liquid, having a b.p. 64°C./0.2 mm., and a specific gravity of $n_D^{26}$ 1.4585.

Anal. Calc'd. for $C_8H_{17}NO_2$: C, 60.34; H, 10.76; $N_k$, 8.80.

Found: C, 60.52; H, 10.80; $N_k$, 8.70.

Other monofunctional oxazolidines may be produced in the same manner as used in Procedure 1 and using aldehydes and ketones such as listed on page 5 above. Examples of such oxazolidines are 2-(3-heptyl)-3-(2-hydroxyethyl)oxazolidine, 2-dodecyl-3-(2-hydroxyethyl)oxazolidine, 3-(2-methyl-2-hydroxyethyl)-5-methyloxazolidine, 3-(2-hydroxyethyl)-2-phenyloxazolidine, 2,2-dimethyl-3-(2-hydroxyethyl)-oxazolidine, 3-(2-hydroxyethyl)-2-benzyl-2-methyloxazolidine, 3-(2-hydroxyethyl)-2-isobutyl-2-methyloxazolidine and 2,2-cyclopentamethylene-3-(2-hydroxyethyl)oxazolidine, and the corresponding 3-(2-hydroxypropyl)-tetrahydro-1,3-oxazines.

TRANSESTERIFICATION

Oxazolidines such as those described in Procedure (1) above may be used to transesterify a polyester of a polycarboxylic acid, such as a dimethyl ester of terephthalic acid. Sodium methoxide used at a level of about 2.0 mole percent based on the diester serves as an effective catalyst for the transesterification reaction. A 5 to 10 percent molar excess of the monofunctional oxazolidine may be used. Toluene may be used as the reaction solvent and the alcohol, such as methanol, which is produced during the transesterification reaction may be removed by azeotropic distillation. In the transesterification reaction the poly(oxazolidinyl) ester may be isolated simply by removing the solvent after filtration. The resulting product may then be stripped in a wiping-film still. The stripping operation also removes unreacted starting materials as well as trace amounts of solvent. The poly(oxazolidinyl) esters produced may be either in liquid or solid form and may vary considerably in color and viscosity. The infrared spectra of the compounds produced in the procedures described below were consistent with the expected structure.

2. Preparation of Bis[2-(3-oxazolidinyl)ethyl] terephthalate.

A 2-1. three necked flask was equipped with a rubber serum cap, a mechanical stirrer and a Y-tube adapter fitted with a thermometer (extended into the solution) and a 10–12 inch Vigreaux column. The column was surmounted with an isothermal distillation head which permitted thermostatic control of distillate takeoff as well as control of reflux ratio. This apparatus was provided with a graduated receiver and a drying tube. The flask was charged with 194 g. (1.0 mole) of dimethyl terephthalate, 258 g. (2.20 moles) of N-(2-hydroxyethyl) oxazolidine and 600 ml. of toluene. The stirred solution was heated to reflux and 25 ml. of distillate was collected. The head was set at 90°C. at 50 percent takeoff followed by the cautious addition of 4.4 mls. (4.2 g., 1.9 mole percent) of 25 percent sodium methoxide solution (in methanol). The concentration of methanol in the distillate was determined through refractive index. Decolorizing-charcoal was added to the stirred solution and the resulting mixture allowed to cool over one hour. The mixture was suction filtered through filter aid and the filter cake washed with toluene. The combined filtrate and wash were stripped twice in a wiping-film still at 100°C./1.5 mm., and 150°C./1 mm., respectively. There was obtained 298.2 g. of an amber oil which crystallized on cooling, m.p. 58°–61°C.

Anal. Calc'd. for $C_{18}H_{24}N_2O_6$: C, 59.33; H, 6.64; N, 7.69.

Found: C, 59.32; H, 6.74; N, 7.59.

3. Preparation of Bis[2-(3-oxazolidinyl)ethyl] adipate.

The same apparatus used in 2) was again used. A stirred solution of 348 g. (2.0 moles) of dimethyl adipate, 480 g. (4.1 moles) of N-(2-hydroxyethyl)oxazolidine in 1000 ml. of toluene was heated to reflux and 50 mls. of distillate was collected. The solution was allowed to cool to 114° C. and 2.2 ml. of 25 percent sodium methoxide (in methanol) was added. The head was set at 68°C. (50 percent takeoff) and the solution reheated to reflux; distillation was carried out with periodic incremental additions of sodium methoxide. The reaction mixture contained a gelatinous solid which was removed by suction filtration through filter aid; the latter was washed twice with toluene and the filtrate and combined washes were stripped twice in a wiping-film still at 150°C./20 mm. and 150°C./1 mm. respectively. The concentrate (623 g.) was distilled (in two passes) at 250°C./1 mm. to give 389.0 g. (56.5 percent) of a yellow liquid.

Anal. calc'd. for $C_{16}H_{28}N_2O_6$: C, 55.80; H, 8.19; N, 8.13.

Found: C, 55.65; H, 8.31; N, 8.32.

4. Preparation of Bis[2-(3-oxazolidinyl)ethyl] carbonate.

The preparation of the poly(oxazolidinyl)carbonate is shown by the following illustrative reaction sequence:

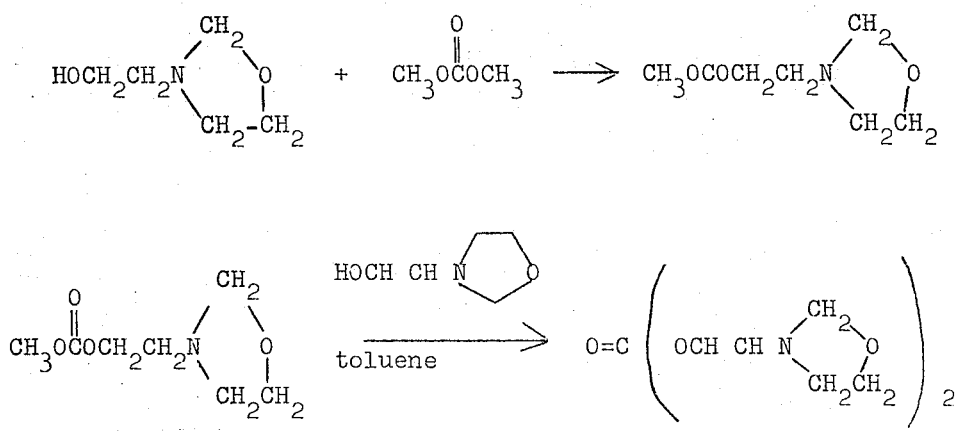

A stirred solution of 58.6 g. (0.50 mole) of N-(2-hydroxyethyl)oxazolidine and 0.6 ml. (0.25 mole percent) of 25 percent sodium methoxide solution in 112.8 g. (1.25 moles) of dimethyl carbonate was heated to reflux in essentially the same apparatus used in 2). Distillation of the methanol/dimethyl carbonate mixture was controlled in a step-wise (5°) manner from 70°–85°C. over a period of 135 minutes. During this time an additional 0.6 ml. of sodium methoxide solution was added. A total of 15.4 g. (91 percent) of methanol was produced. The unreacted dimethyl carbonate was removed by stripping under reduced pressure.

To the resulting product was added 70.4 g. (0.60 mole) of N-(2-hydroxyethyl)oxazolidine, 1.1 ml. of 25 percent sodium methoxide (in methanol) and 300 ml. of toluene. The solution was heated to reflux and the methanol produced was removed by azeotropic distillation. At the end of approximately 1.5 hr. gas-liquid chromatographic analyses indicated the complete disappearance of the monoester. The reaction solution was stripped under reduced pressure in a wiping-film still at 125°/15 mm and the concentrate distilled at 240°C./0.7 mm. to provide 106.7 g. yellow liquid.

Anal. calc'd. for $C_{11}H_{20}N_2O_5$: C, 50.75; H, 7.74; N, 10.76.

Found: C, 50.54; H, 7.67; N, 10.81.

5. Preparation of Bis[2-(2-isopropyl-3-oxazolidinyl)ethyl] adipate.

A stirred solution of 348.4 g. (2.0 moles) of dimethyl adipate, 668 g. (4.20 moles) of 3-(2-hydroxyethyl)-2-isopropyl-oxazolidine and 1200 ml. of toluene was heated to reflux in the apparatus described for 2) and 40 ml. of distillate was collected (pot temp. 126°C.). The solution was allowed to cool to about 95°; the head was set at 68°C. (50 percent takeoff) and 8.6 ml. (81. g., 37.5 moles) of 25 percent sodium methoxide solution (in methanol) was added. The stirred solution was again heated to reflux and the methanol produced was removed by azeotropic distillation. The reaction solution was repeatedly stripped on a wiping-film still at 200°C./0.4 mm. There was obtained 568.1 g. (A) of concentrate and 90.0 g. (B) of distillate. The concentrate (A) was redistilled at 260° C./0.4 mm. to give 530.7 g. of nearly colorless distillate, $n_D^{26}$ 1.4688. The infrared spectrum was consistent with the expected structure.

Anal. calc'd. for $C_{22}H_{40}N_2O_6$: C, 61.65; H, 9.41; N, 6.54.

Found: C, 61.74; H, 9.32; N, 6.40.

6. Similar procedures yield bis[2-(2-isopropyl)-3-oxazolidinyl)ethyl] itaconate and bis[2-(2-isopropyl-3-oxazolidinylethyl] maleate.

7. Following the procedures of Examples 2 to 6 above, the oxazolidines and oxazines of Example 1 are transesterfied with esters of the following acids: saturated dicarboxylic acids, e.g. oxalic, malonic, succinic, methylmalonic, isosuccinic, glutaric, adipic, pinielic, sebacic acid, azelaic acid, 1,6,-ethylhexanedioic acid, dodecanedioic acid, 1,18-octadecanedioic acid, 1,36-hexatriacontanedioic acid, and the like, unsaturated dicarboxylic acids, e.g. itaconic, maleic, fumaric, α-methyleneglutaric, aromatic dicarboxylic acids, e.g. o-phthalic, terephthalic, isophthalic, tetrachlorophthalic, mellitic, pyromellitic and 1,1,3-trimethyl-5-carboxy-3-(p-carboxyphenyl)indane.

It is to be understood that changes and variations may be made without departing from the spirit and scope of this invention as defined by the appended claims.

What is claimed is:

1. A compound of the formula

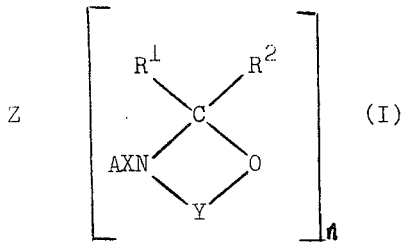

wherein $n$ is an integer equal to the valence of Z of two or three;

Z is saturated divalent hydrocarbon alkylene having 1 to 34 carbon atoms, di- or trivalent phenylene or halo-substituted phenylene, the divalent hydrocarbon residue of 1,1,3-trimethyl-5-carboxy-3-(p-carboxyphenyl) indane, ($C_2$-$C_3$) divalent alkenyl or

A is -O- when Z is

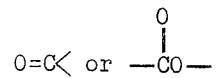

(the free carbonyl being connected to Z) when Z is other than

X is

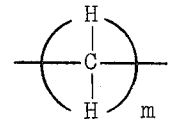

wherein $m$ is 2 or 3;

$R^1$ is hydrogen, phenyl, benzyl or ($C_1$-$C_{12}$)alkyl;

$R^2$ is hydrogen or ($C_1$-$C_4$)alkyl or $R^1$ and $R^2$ can be taken together to form pentamethylene, tetramethylene or ($C_1$-$C_2$)-alkyl-substituted pentamethylene or tetramethylene; and Y is

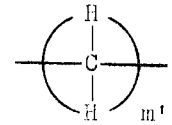

wherein $m'$ is 2 or 3.

2. A compound as defined in claim 1 where Z is divalent ($C_1$-$C_4$) alkylene.

3. A compound as defined in claim 2 wherein $R^1$ and $R^2$ are hydrogen.

4. A compound as defined in claim 2 wherein $R^2$ is ($C_1$-$C_4$)alkyl and $R^1$ is hydrogen.

5. A compound as defined in claim 1 where $m$ and $m'$ are 3.

6. A compound as defined in claim 1 wherein A is -O-.

7. A compound as defined in claim 1 where A is $-CO_2-$.

8. A compound as defined in claim 1 where $R^1$ and $R^2$ are hydrogen.

9. A compound as defined in claim 1 wherein $m$ and $m'$ are 2.

10. A compound as defined in claim 1 wherein said compound is bis[2-(2-isopropyl-3-oxazolidinyl)ethyl]itaconate.

11. A compound as defined in claim 1 wherein said compound is bis[2-(2-isopropyl-3-oxazolidinyl)ethyl]-terephthalate.

12. A compound as defined in claim 1 wherein said compound is bis[2-(isopropyl-3-oxazolidinyl)ethyl]adipate.

13. A compound as defined in claim 1 wherein said compound is bis[2-(isopropyl-3-oxazolidinyl)ethyl]-maleate.

14. A compound as defined in claim 1 wherein said compound is bis[2-(3-oxazolidinyl)ethyl]carbonate.

* * * * *